June 22, 1965  C. H. WERTH  3,190,152
MICROMETRICALLY ADJUSTABLE TOOL ARM
Filed Sept. 17, 1962  4 Sheets-Sheet 1
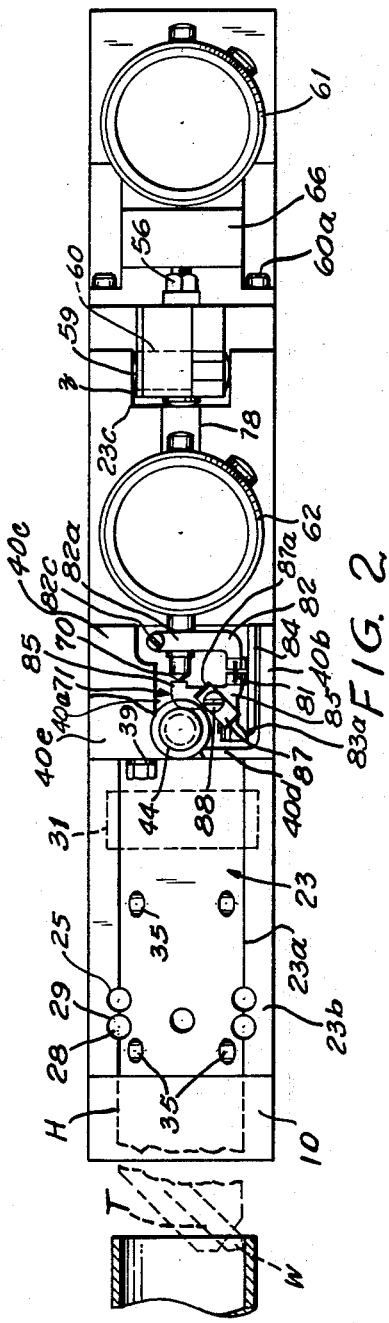
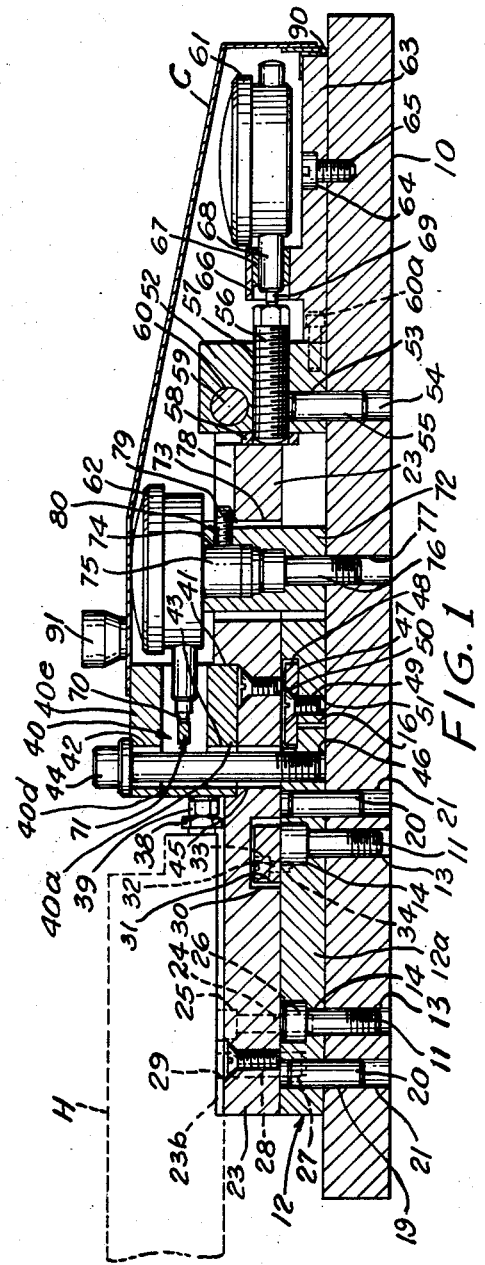
INVENTOR.
CARL H. WERTH
BY June 22, 1965    C. H. WERTH    3,190,152
MICROMETRICALLY ADJUSTABLE TOOL ARM
Filed Sept. 17, 1962    4 Sheets-Sheet 2
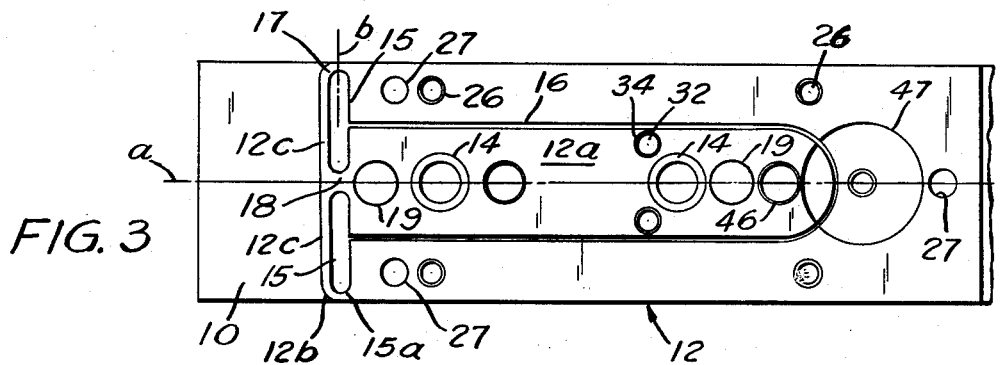
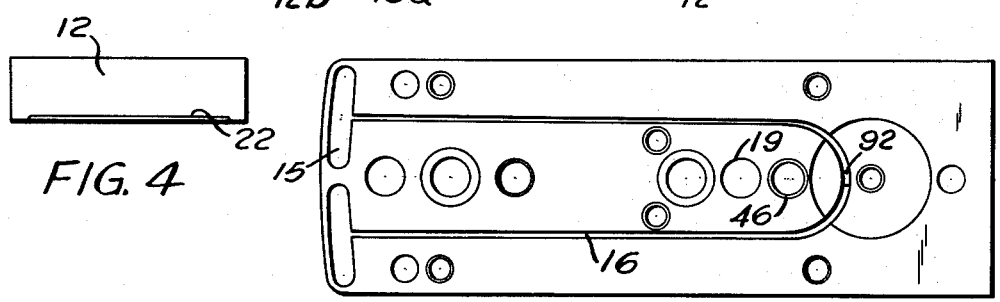
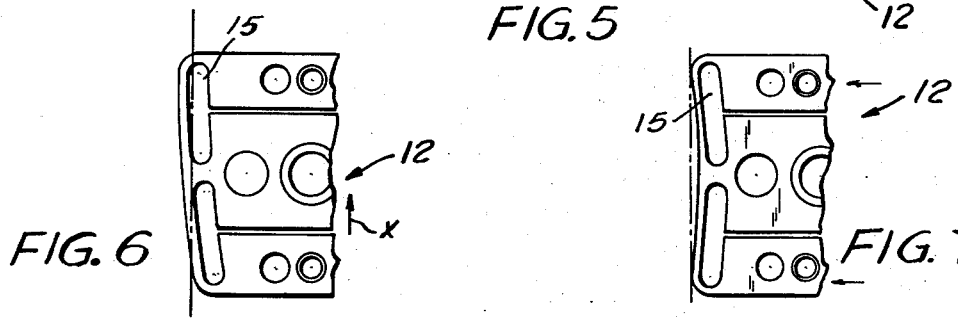
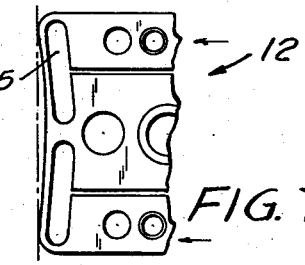
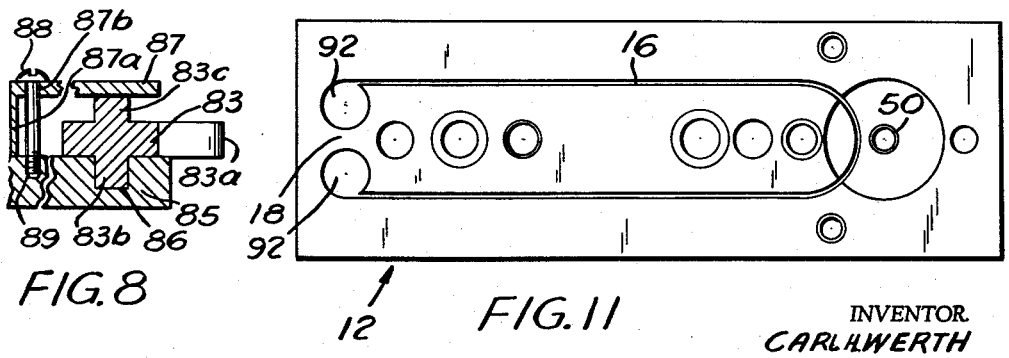
INVENTOR.
CARL H. WERTH
BY June 22, 1965     C. H. WERTH     3,190,152
MICROMETRICALLY ADJUSTABLE TOOL ARM
Filed Sept. 17, 1962     4 Sheets-Sheet 3

INVENTOR.
CARL H. WERTH
BY

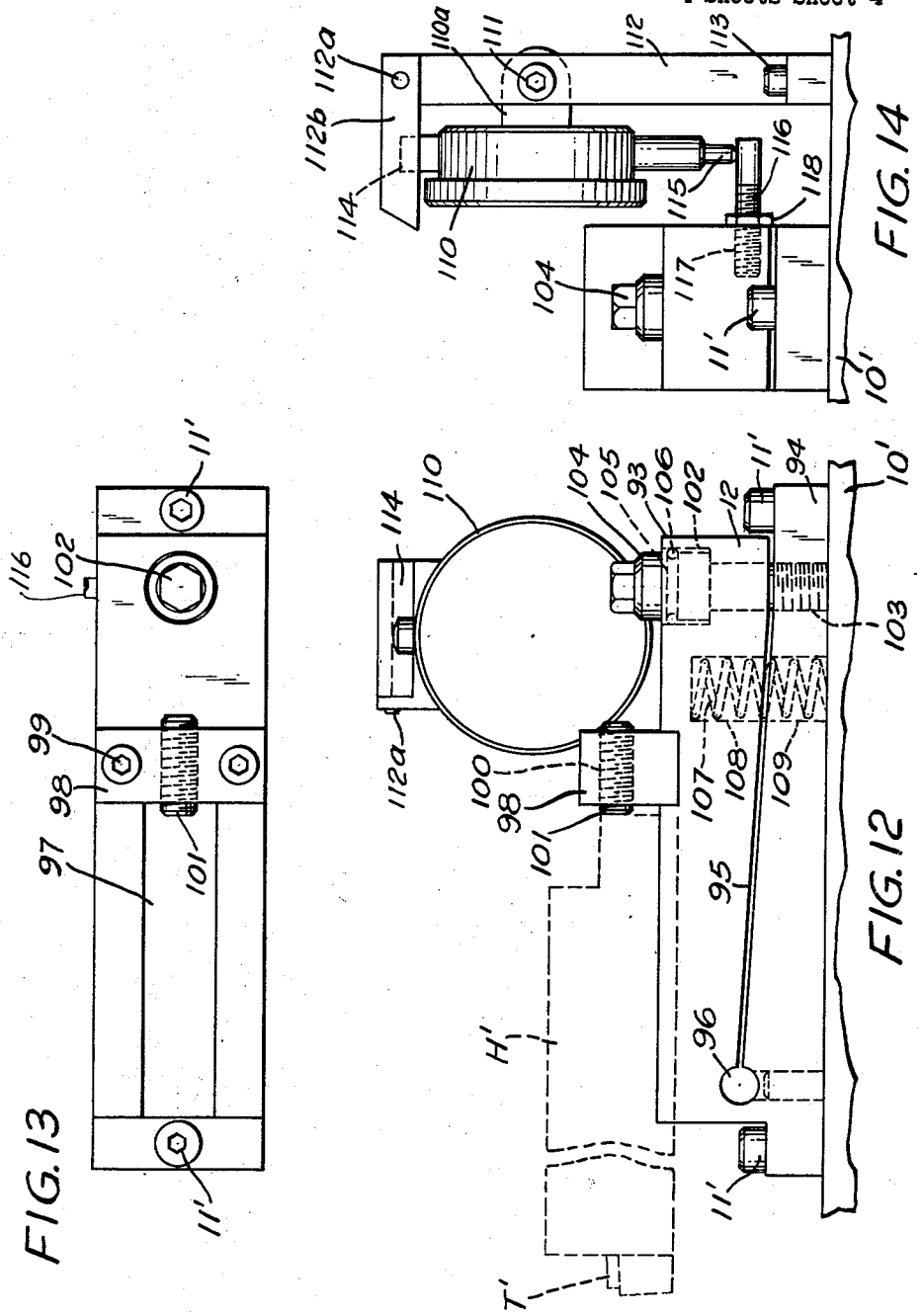

United States Patent Office 3,190,152
Patented June 22, 1965

3,190,152
MICROMETRICALLY ADJUSTABLE TOOL ARM
Carl H. Werth, 818 Thurman St., Saginaw, Mich.
Filed Sept. 17, 1962, Ser. No. 223,886
16 Claims. (Cl. 77—58)

This invention relates to adjustable tool arms and more particularly to a device of this character wherein a tool bit mounted by the arm can be adjusted with both facility and precision in either an axial direction or in a radial direction to a desired position relative to a workpiece which is to be bored, turned, faced, or otherwise machined.

Briefly, the invention is concerned with a tool arm, ideally suited to production operations, having a part which is flexible or deformable under load to permit adjustment of the position of the tool bit in the manner indicated. Preferably, the tool arm mounts indicators or the like to measure the adjustment which is made. The purpose of the movement may be to reach a finely adjusted position or to compensate for tool wear. Tool arms on the market today are generally constructed with the tool arm mounted to pivot about a pivot post. This construction creates certain problems believed attributable to the fact that one part must journal the other and consequently the fit of the parts cannot be so tight as to frictionally restrict their movement. The necessary clearance or looseness between the tool arm and pivot post or a bushing and pivot post in such constructions necessarily affects the accuracy of any measured adjustment which it is desired to make. With wear of the various parts, inaccuracies are, of course, compounded. Further, with this looseness the various parts can be moved relatively, and their position relative to one another changed, by the application of external forces which may move the parts axially back and forth, laterally sideways, or up and down. Since in many cases the parts are initially machined to provide a minimum clearance to overcome the disadvantages mentioned, sometimes galling and seizing results and particularly when dirt gets into the pivot post assembly.

A prime object of the invention is to provide a very practical tool arm which can be used in a variety of machining operations, or a combination of such operations, on lathes, boring machines and the like, to substantially reduce the time required for tool adjustments which can, of course, be very costly in high production operations.

Another object of the present invention is to provide such a tool arm which in its construction avoids the use of a pivot post and employs instead a deformable member which permits micrometric adjustment in both the axial and radial directions to be accomplished readily by a machinist of ordinary skill.

A further object of the invention is to provide a tool arm assembly which can be constructed without the need of holding relatively movable parts to close tolerances which tax the skills of the best machinists.

Another object of the invention is to provide a tool arm construction in which wear, and galling or seizing of the parts, are not problems and the tool arm is positively held from inadvertent displacement by external forces in all directions, axial and lateral forces applied to the arm being fully resisted by control screw members and lifting forces being resisted by positive structural members.

Another object of the invention is to provide a tool arm assembly in which "slip stick," the tendency for the movable part to stick until its inertia is overcome, is avoided.

A further object of the invention is to design a more rigid tool arm incorporating a preloaded flexible bar, and a tool arm which with built in hold-down and keeper members is virtually damage proof if disassembled by inexperienced personnel.

Other objects and advantages of the invention will be pointed out specifically or will become apparent from the following description when it is considered in conjunction with the appended claims and accompanying drawings, in which:

FIGURE 1 is a sectional, longitudinal elevational view;

FIGURE 2 is a top plan view thereof with the broken lines illustrating a tool holder and tool mounted in position on the tool arm assembly;

FIGURE 3 is an enlarged, fragmentary, top plan view showing the flexible bar, which is employed, in preloaded operative condition, the top plate and certain other parts of the mechanism being omitted from the view for purposes of clarity;

FIGURE 4 is a similarly enlarged, end elevational view of the flexible bar only;

FIGURE 5 is a similarly enlarged, top plan view of the flexible bar, illustrating the manner in which it is formed;

FIGURE 6 is a similarly enlarged, fragmentary, top plan view of the bar, illustrating in a considerably exaggerated manner the deformation or deflection which occurs when a radial adjustment is made in the direction of the arrow;

FIGURE 7 is a similarly enlarged, fragmentary, top plan view of the flexible bar illustrating in an exaggerated manner the deformation which occurs when an axial adjustment is made in the direction of the arrow;

FIGURE 8 is a greatly enlarged, transverse, sectional view taken on the line 8—8 of FIGURE 9, illustrating the lever device employed to transmit radial or lateral movements to a radial movement indicating device;

FIGURE 11 is a top plan view of another form of flexible bar used for tool adjustment in a radial direction only;

FIGURE 12 is a side elevational view illustrating another embodiment of the invention in which vertical movement of a flexible bar section is obtained;

FIGURE 13 is a top plan view thereof; and

FIGURE 14 is an end elevational view thereof.

Figure 10:
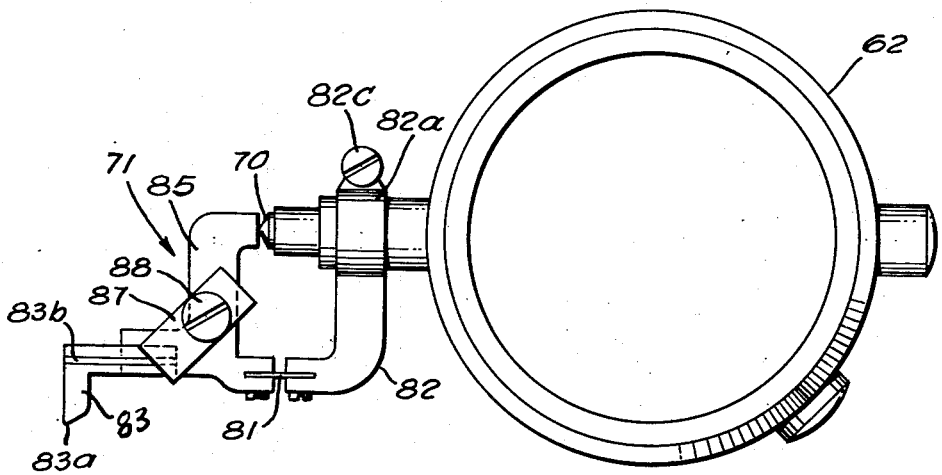
FIGURE 10 is a top plan view showing the device in an alternate position.

Referring now more particularly to the accompanying drawings in which preferred embodiments of the invention only are shown, a numeral 10 generally refers to a tooling plate which is mounted in fixed position on the base or bed of a machine tool, such as a boring machine, in any suitable manner adjacent the workpiece W which is mounted in a chuck or the like on the spindle of the machine. Mounted on the tooling plate 10 by means of suitable cap screws 11 is a deflectable or deformable bar or plate 12, tooling plate 10 having threaded screw-receiving openings 13 and bar 12 having counterbored openings 14 in its central portion 12a as shown. As shown particularly in FIGURES 3 and 5–7, the bar 12, which is formed of a suitable "spring" steel or other rigid and resilient material, is provided at its front end with a pair of transversely extending, narrow, elongated openings 15 joined by a U-shaped slot 16 which substantially isolates the rigidly secured central portion or section 12a of the bar 12 from the outer portion or section thereof. The ends of the openings 15, which are curvilinear as shown at 15a, extend sufficiently close to the corresponding curvilinear side portions 12b of the bar 12 that relatively thin, flexible portions 17 are formed at the front corner portions of the bar and the openings 15 are also closely spaced from the front edge of the bar 12 to form reed portions 12c. It will be noted that the portion 18 of the bar between the openings 15 is somewhat wider and is resistant to deflection.

To assure precise alignment, openings 19 are provided in the portion 12a for dowel pins 20 which extend into openings 21 in the tooling plate 10. As shown particularly in FIG. 4, the under side of the bar 12 is recessed from end to end, as at 22, and sufficient clamping pressure is exerted by the cap screws 11 so that the bar 12 is preloaded vertically when it is assembled to the tool plate 10.

While the center line of the tool holder H for the tool T is along the center line a of the bar 12, the top plate 23 on which it is supported is secured to the outer deflectable portions of the bar 12 by cap screws 24 (FIGURE 1) extending into openings 25 in the top plate 23 and through to threaded openings 26 in the outer portions of the bar 12. Dowel openings 27 are also provided in the bar 12 to receive dowel pins 28 which extend through openings 29 in the top plate 23 to assure precise alignment. The top plate 23 is longitudinally grooved as at 23a so as to provide side wall portions 23b to snugly receive the tool holder H. Provided in the under side of top plate 23 is a transverse groove 30 to receive a hold-down bar 31 which is secured to the central bar portion 12a by cap screws 32 extending from counterbored openings 33 in the bar 31 into threaded openings 34 provided in the bar portion 12a. The hold-down bar 31 extends across the sides of the U-shaped slot 16 to overlie the outer deflectable portions of the bar 12 as shown in FIGURE 2 and effectively holds the entire bar 12 down against the tooling plate 10 without interfering with its flexing movement. To secure the tool holder H rigidly in the groove 23a, angularly disposed hold-down bolts (not shown) extend through angularly extending openings in the tool holder H and aligned openings 35 in the top plate 23.

Also provided on the tool holder H is the usual locating bolt 38, which is adapted to abut against a locator bolt 39 carried by an indicator housing generally designated 40 which is received within a transverse groove 41 provided in the upper face of the top plate 23. The indicator housing 40 includes a bottom wall 40a, side walls 40b and 40c, a front wall 40d, and a top wall 40e. The top wall 40e and bottom wall 40a are bored as at 42 and 43, respectively, to receive a bolt 44 which also extends through an opening 45 in top plate 23 and is threaded into an opening 46 in the central portion 12a of bar 12. Openings 42, 43, and 45 are sufficiently enlarged to permit movement of the housing 40 and plate 25 in an axial and radial direction relative to bolt 44 which is not tightly clamped and does not restrict such movement.

It will be seen that the bar 12 at its rear end is recessed as at 47 to receive a keeper disk 48 overlying the rear portion of the bolted down section 12a of the bar 12, which accordingly prevents downward movement of the deflectable portion of bar 12. A cap screw 49 provided in a countersunk opening 50 in the keeper plate 48 extends down into a threaded opening 51 in the outer section of the bar 12, as shown.

Mounted on the tooling plate 10 immediately to the rear of top plate 23 is a block member 52 which has openings 53 communicating with openings 54 in the tool plate 10 to receive dowel pins 55 which align the block 52. An adjusting screw 56 is received in an axially extending threaded opening 57 in block 52 and centrally engages the bifurcated portion 23c of the rear end of the plate 23, as shown, the screw 56 at its front end extending through a preload ring 58 which is of greater thickness than the space maintained between the rear end of plate 23 and front face of block 52 when the device is in operative condition to preload the plate 23, and thereby the tool holder H, in a forward direction. Preferably, the ring 58 is .010 to .015 of an inch greater in thickness than the width of the space mentioned when the screw 56 is in operating rearmost position. Clearly, movement of the screw 56 forwardly operates to move the tool holder H and tool T forwardly, the axial range of adjustment preferred being about .040 to .050 of an inch.

Also provided in the block 52 is a laterally or transversely extending adjusting screw 59 which is received within the bifurcated portion 23c of plate 23, the screw 59 extending through a threaded opening 60 provided in the block 52. The screw 59 is snugly received within the bifurcated portion 23c and abuts the side walls thereof so that axial adjustment in either direction will swing the tool holder H and tool T laterally or radially relative to the workpiece W. The position of the block 52 is maintained not only by the dowels 55 but by cap screws 60a, as will become apparent.

Preferably, standard indicators 61 and 62 will be employed to measure the axial and radial movement of the tool holder H and tool T clamped therein. The indicator 61 can be supported by an indicator support block 63 which is fixed to the tooling plate 10 in any suitable manner, as with cap screws 64 extending into threaded openings 65 in the tooling plate 10. Provided in the block 63, which through screws 60a secures the block 52, and in axial alignment with the threaded opening 57 in block 52 is a bore 66 having a bushing 67 tightly receiving the split sleeve 68 of the indicator 61. Indicator 61 is preferably a standard Federal C-6-K flat back and split sleeve indicator which has its reciprocable, spring returned plunger 69 normally depressed a predetermined distance by the adjusting screw 56.

The indicator 62 is preferably a Federal C-6-K screw bracket indicator which has its depressable, spring returned plunger 70 depressed by a two-part bell crank lever assemlby 71, as shown in FIGURE 2. An indicator mounting post 72 extending through an enlarged opening 73 in the top plate 23 is bored as at 74 to receive the shank portion 75 of the indicator 62 which seats on a cap screw 76 provided to secure the post 72 in position, the cap screw 76 extending down into a threaded opening 77 provided in the tooling plate 10. An access slot 78 is provided in plate 23 so that a set screw 79 extending into a threaded opening 80 in the post 72 can be employed to fix the indicator 62 in position. The bell crank lever assembly 71, which will presently be described in detail, is hinged by a leaf spring 81 to an arm 82 having a split ring socket portion 82a which clamps around the indicator plunger housing and is secured by clamp screw 82c as shown.

Figure 9:
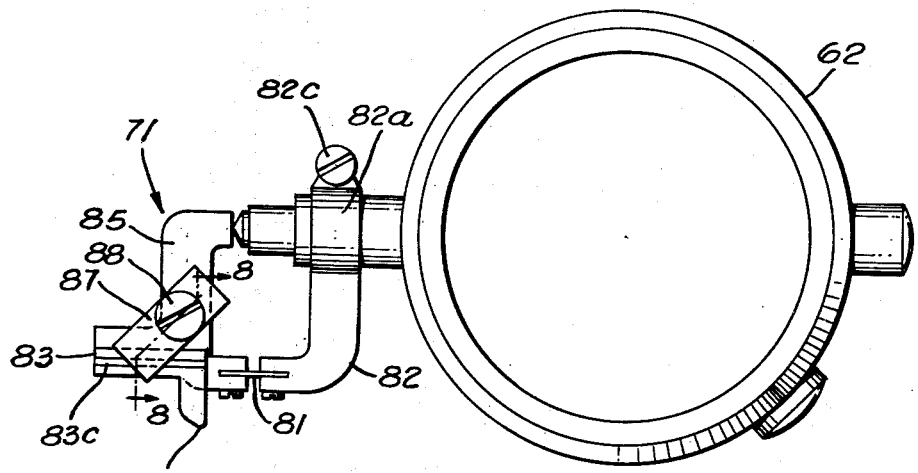
FIGURE 9 is a top plan view of the lever device.

As will be seen, the bell crank assembly 71 (FIGURES 8-10 particularly) is adjustable in axial length to permit radial movement readings to be read directly on the dial of the indicator 62 even though tool holders of varying length are employed. The assembly 71 is made up of a member 83 which is generally cruciform in cross-section and includes an engaging tip portion 83a which the spring 81 maintains in engagement with a rib 84 provided on the one side wall 40b of the indicator housing 40 throughout the range of movement of the tool arm. The member 85 which engages the plunger 70 of the indicator 62 and is affixed to spring 81 is grooved in a longitudinal direction, as at 86 (see FIGURE 8), to receive one of the opposite keys 83c and 83b provided on member 83, dependent on the position of the tool holder H, the key or spline 83b being shown received in the groove 86 in FIGURE 8. To hold the members 83 and 85 in assembled relation, a keeper plate 87 having a downwardly dependent flange 87a is drilled as at 87b to receive a screw 88 which is threaded down into an opening 89 in member 85. It will be seen in FIGURES 2 and 10 that the engaging surface 83a is forwardly disposed to provide a device of extended range in which the tool holder can be quite a bit shorter in length, for instance. The screw 88 can be removed and keeper plate 87 swung away from an overlying position with respect to member 83 so that member 83 can be turned end for end and inverted. When this adjustment is made, the member 83c is received in the groove 86 and the engaging surface 83a is rearwardly disposed. Because of this unique arrangement, the dial indicator can register radial movement readings of the tool tip at a workpiece with tool holders H of somewhat varying length, for instance, from 1.8 inches to 5 inches, the keeper plate 87 clamping the member 83 in an adjusted position in which there is a 2:1 ratio in the distance from the tool tip to the line *b* in FIGURE 3 and in the distance from line *b* to tip 83*a*.

Provided to protect the indicator apparatus and keep dirt and other foreign matter out of the operating elements of the tool arm is a cover C having top and side walls, which is hinged as at 90 to the indicator support plate 63. The cover 89 is preferably made up of a transparent material so that indicators 61 and 62 can be read with the cover closed and, as shown in FIGURE 1, a knob 91 is provided to facilitate lifting of the cover so that there is access to the adjusting screws 56 and 59.

Preferably, the plate or bar 12 is used in a preloaded condition. In FIGURE 3, for instance, considering only the bar 12, it will be noted that the slots 15 extend transversely, instead of angularly as in FIGURE 5, for example. Initially, as machined, the slots 15 extend transversely. To condition the bar 12, a wedge 92 is inserted in the rear portion of slot 16, as shown in FIGURE 5, to deform the bar in the manner illustrated. Then the deflected bar 12, with wedge 92 in position, is passed into a heat treat furnace and the metal is set in the shape in which it is shown in FIGURE 5 so that it substantially remains in this condition when wedge 92 is removed. When the bar 12 is used initially, the adjusting screw 56 is moved forwardly until the bar 12 assumes the position in which it is shown in FIGURE 3. In this condition the bar 12 is preloaded and the "slip stick" effect is avoided. With the indicator dial 61 set to zero at this point, the flexing of the bar 12 in its range of operation is from the position in which it is shown in FIGURE 3 toward the somewhat exaggerated position in which it is shown in FIGURE 7. Actually, the working range is between .040 to .050 and the rather extreme position shown in FIGURE 7 for purposes of illustration is never reached.

For purposes of explaining the operation of the tool arm assembly it will be assumed that there has been wear of the tool to the extent that tool holder T must be moved forwardly .010 to perform a facing operation or the like on the workpiece W. The adjusting screw 56 is turned in a direction to move the top plate 23 forwardly and since the top plate 23 is fixed to the transversely outer side portions of the bar 12 these portions are moved forwardly relative to the central portion 12*a* so that deformation in the manner of FIGURE 7 occurs. As the adjusting screw 56 moves forwardly the plunger 69 of the indicator is urged outwardly by the indicator spring and the adjustment forwardly is discontinued when the dial of the indictor 61 indicates that a forward movement of .010 has occurred.

The adjustment of screw 59 to compensate for tool wear radially is similarly accomplished. First of all, the member 83 is positioned to obtain the 2 to 1 ratio in distances previously mentioned, so that the indicator 62 will read directly. In the operation of adjustment screw 59 to move the tool T radially outwardly, in the direction *x* in FIGURE 6, for instance, the adjusting screw is turned in a direction to bear against the surface *z* in FIGURE 2. This tends to deform the bar to the condition indicated in FIGURE 6 and to move the rib 84 toward the surface 83*a* and further depress plunger 70. The adjustment of screw 59 is continued until the desired movement has been effected as indicated by the movement of the indicator pointer. The indicator could, of course, be used to measure movement in the opposite direction, with member 85 then permitting the indicator plunger 70 to move outwardly. The zero position of the indicator dial would have to be set initially with the plunger 70 moved inwardly a sufficient distance to provide the range desired. Because the hinge spring 81 is loaded to keep the surface 83*a* in engagement with rib 84 at all times, the member 85 moves away from the plunger 70, and the indicator spring will move the plunger 70 outwardly.

In FIGURE 11 a modified flexible bar 12 is shown which is useful when there is to be adjustment in a radial direction only. In this case the flexible bar 12, identical numerals being used to identify identical parts, includes a pair of circular bores 92 at its front end connecting with the U-shaped slit 16 in place of the former relatively elongated slots 15. The flexing area is then the areas formed between the bores 92 and the front of the bar and radial adjustment of the tool holder can be accomplished in the manner described previously. In this construction, which is otherwise identical, no axially adjustable screw 56 or indicator 61 is employed.

In FIGURES 12–14 a vertically adjustable tool holder is illustrated and for purposes of convenience similar parts are identified by the same numbers as previously except that the numbers are primed. In FIGURE 12 the flexible bar 12′ is shown as having upper and lower portions 93 and 94, respectively, separated by a slot 95 which terminates near the front end of the flexible bar 12′ in a bore portion 96. The lower portion 94 is fixed to the tooling plate 10′ in any suitable manner, as with socket head cap screws 11′, and the portion 93 can be deflected in a vertical direction relative to the portion 94, portion 93 being axially recessed as at 97 to snugly accommodate the tool holder H′ which mounts tool T′. A block 98 secured on portion 93 by cap screws 99 has a central threaded opening 100 mounting a threaded locating stud 101 for the holder H′.

Provided in a counterbored opening 102 in flexible bar portion 93 and extending into a threaded opening 103 in bar portion 94 is an adjusting screw 104 which is grooved as at 105 to accommodate an O-ring 106 which keeps dirt and other foreign matter out of the assembly. Coil spring 107 mounted in aligned openings 108 and 109 in the sections 93 and 94, respectively, tends to bias the portion 93 upwardly, away from the portion 94, and thus to preload the section 93. To measure the vertical adjustment of portion 93, a standard indicator 110 of the type previously mentioned has a mounting extension 110*a* pivotally mounted as at 111 on a bracket 112 which can be secured by cap screws 113. The bracket 112 pivotally mounts (as at 112*a*) a top portion 112*b* having an opening 114 for receiving the one part of the indicator, and the depressable spring returned plunger 115 of the indicator engages a stud 116 which is threaded into the portion 93 of the flexible bar as at 117 and is secured by a half nut 118.

If the tool holder H′ is to be adjusted upwardly, the parts are initially set so that the plunger 115 of the indicator 110 is only slightly depressed and the indicator dial will be set at zero. Obviously, the parts can also be set to provide a downward adjustment and a measurement thereof. In this situation the plunger 115 would initially be depressed by stud 116 a sufficient distance so that its spring biased return would provide the desired range of movement. Suitable guards (not shown) can, of course, be provided on the device for the indicator 110.

It should be apparent that I have perfected a tool arm of greatly improved construction which obviates many of the problems encountered with tool arms of other design.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:
1. In a tool arm; support means for attachment to a machine tool frame opposite the spindle thereof; flexible bar means mounted thereon and having a resilient por- tion deformable in an axial and radial direction; tool holding means on said deformable portion; and means for selectively deforming said deformable portion axially and radially.

2. In a tool arm; support means; holder carrying means thereon mounted for axial and radial deformation relative thereto; holder means carried by said latter means; and means for deforming said holder carrying means in either an axial or a radial direction to move said holder means in independent directions axially or radially.

3. The combination defined in claim 2 in which said holder carrying means is in preloaded, deformed condition through its range of movement.

4. The combination defined in claim 2 in which displaceable measurement means is mounted on said support means in position to be displaced by said holder carrying means.

5. The combination defined in claim 2 in which displaceable measurement means is mounted on said support means in position to be displaced by said means for deforming said holder carrying means.

6. In a tool arm; support means; a flexible bar having a U-shaped slot therein with the legs thereof terminating adjacent one end of the bar in enlarged side openings; the slot and openings defining a central section and outer section; means for rigidly securing one section to said support means; a holder means carried by the other section; and means for deforming said other section.

7. The combination defined in claim 6 in which said central section is secured to said support means.

8. The combination defined in claim 6 in which said side openings are transversely elongate and define relatively thin, deformable walls with side portions of the flexible bar.

9. The combination defined in claim 6 in which said section secured to said support means is grooved and said means securing said section to the support means exerts sufficient force to preload said section vertically.

10. The combination defined in claim 6 in which said side openings are relatively closely spaced to an end portion of said flexible bar to define narrow, deformable walls between said end portion and openings.

11. The combination defined in claim 6 in which said central portion is initially displaced from said outer section by deforming said flexible bar.

12. The combination defined in claim 6 in which a displaceable measuring means is mounted on said support means and a motion transmitting device including relatively adjustable parts to change the length of said device is connected between said measuring means and holder means to measure deflection thereof.

13. In a tool arm; support means for attachment to a machine tool frame opposite the spindle thereof; holder carrying means thereon including a portion mounted for radial movement relative thereto and a holder with a tool thereon; movement measuring means; movement transmission means including a portion adjustable in axial length relative to another portion between said holder carrying means and movement measuring means for compensating for different distances from the holder to the work engaging surface of the tool; and means for releasably securing said portions in various relative axial positions.

14. The combination defined in claim 13 in which said movement transmission means includes telescoping parts.

15. The combination defined in claim 13 in which said movement transmission means includes a bell crank lever made up of two parts having a spline and groove connection with one part in engagement with said movement measuring means and the other having one end formed with a surface adapted to engage said holder mounting means; said other part being turnable end for end and reversible to vary the length thereof transmitting movement to said one part.

16. The combination defined in claim 15 in which said other part has axially extending splines on its upper and lower surfaces.

References Cited by the Examiner

UNITED STATES PATENTS

| | | |
|---|---|---|
| 2,266,339 | 12/41 | Shutz. |
| 2,445,013 | 7/48 | Winkler. |
| 2,844,053 | 7/58 | Wagner et al. |
| 2,928,906 | 3/60 | Gernert _____ 29—97.5 |
| 2,988,943 | 6/61 | Trible _____ 82—36 |
| 3,051,029 | 8/62 | Cashman et al. _____ 29—98 |

WILLIAM W. DYER, *Primary Examiner.*

JOHN C. CHRISTIE, LEON PEAR, *Examiners.*